United States Patent
Oota et al.

(10) Patent No.: US 10,981,360 B2
(45) Date of Patent: *Apr. 20, 2021

(54) INTERMEDIATE FILM FOR LAMINATED GLASS, AND LAMINATED GLASS

(71) Applicant: SEKISUI CHEMICAL CO., LTD., Osaka (JP)

(72) Inventors: Yuusuke Oota, Shiga (JP); Yasuyuki Izu, Shiga (JP); Daisuke Nakajima, Shiga (JP); Juichi Fukatani, Tokyo (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 133 days.

This patent is subject to a terminal disclaimer.

(21) Appl. No.: 16/532,756

(22) Filed: Aug. 6, 2019

(65) Prior Publication Data

US 2019/0358936 A1 Nov. 28, 2019

Related U.S. Application Data

(63) Continuation of application No. 14/431,326, filed as application No. PCT/JP2013/076534 on Sep. 30, 2013, now Pat. No. 10,421,254.

(30) Foreign Application Priority Data

Sep. 28, 2012 (JP) ................. 2012-218735
Sep. 28, 2012 (JP) ................. 2012-218739

(51) Int. Cl.
| | | |
|---|---|---|
| *B32B 17/10* | (2006.01) | |
| *C08K 5/098* | (2006.01) | |
| *C08K 5/12* | (2006.01) | |
| *B32B 27/18* | (2006.01) | |
| *C09D 129/14* | (2006.01) | |

(52) U.S. Cl.
CPC .. *B32B 17/10669* (2013.01); *B32B 17/10688* (2013.01); *C08K 5/098* (2013.01); *C08K 5/12* (2013.01); *B32B 27/18* (2013.01); *B32B 2250/03* (2013.01); *B32B 2307/40* (2013.01); *B32B 2307/422* (2013.01); *B32B 2419/00* (2013.01); *C09D 129/14* (2013.01); *Y10T 428/3163* (2015.04)

(58) Field of Classification Search
CPC .......... C08L 29/14; C08K 5/098; C08K 5/12; B32B 17/10036; B32B 17/10669; B32B 17/10688; B32B 17/10761; B32B 2250/03; B32B 2250/40; B32B 2419/00; B32B 2605/08; B32B 2605/18; C09K 11/02; C09K 11/06; C09K 2211/1007; C09K 2211/1011; Y10T 428/3163

See application file for complete search history.

(56) References Cited

U.S. PATENT DOCUMENTS

| | | | |
|---|---|---|---|
| 4,292,372 A | * | 9/1981 | Moynihan .............. C08K 5/098 428/437 |
| 6,383,647 B1 | | 5/2002 | Shohi |
| 6,599,630 B1 | | 7/2003 | Fugiel |
| 2011/0073773 A1 | | 3/2011 | Labrot et al. |
| 2012/0068083 A1 | | 3/2012 | Labrot et al. |
| 2012/0094084 A1 | | 4/2012 | Fisher |
| 2012/0162752 A1 | | 6/2012 | Kitano |
| 2012/0299328 A1 | | 11/2012 | Labrot et al. |
| 2013/0050983 A1 | | 2/2013 | Labrot et al. |
| 2013/0242562 A1 | | 9/2013 | Labrot |
| 2013/0252001 A1 | | 9/2013 | Sablayrolles et al. |

FOREIGN PATENT DOCUMENTS

| | | |
|---|---|---|
| CN | 101668714 | 3/2010 |
| CN | 101978305 | 2/2011 |
| DE | 10 2009 044 181 | 4/2011 |
| EP | 2 110 237 | 10/2009 |
| JP | 4-502525 | 5/1992 |
| JP | 2011-178655 | 9/2011 |
| WO | 91/06031 | 5/1991 |
| WO | 2008/123739 | 10/2008 |
| WO | 2010/139889 | 12/2010 |
| WO | 2011/024788 | 3/2011 |
| WO | 2011/042384 | 4/2011 |
| WO | 2012/010444 | 1/2012 |
| WO | 2012/038170 | 3/2012 |
| WO | 2012/072950 | 6/2012 |

OTHER PUBLICATIONS

International Search Report dated Nov. 19, 2013 in International (PCT) Application No. PCT/JP2013/076534.
Extended European Search Report dated Apr. 26, 2016 in European Application No. 13842245.6.

* cited by examiner

*Primary Examiner* — Michael B Nelson
(74) *Attorney, Agent, or Firm* — Wenderoth, Lind & Ponack, L.L.P.

(57) ABSTRACT

Provided is an interlayer film for laminated glass which produces a high contrast image under light radiation, is less susceptible to color changes, and allows for control of the adhesion, as well as a laminated glass including the interlayer film. The interlayer film includes a light emitting layer containing a polyvinyl acetal, a light emitting material having a terephthalic acid ester structure, and a potassium salt.

2 Claims, No Drawings

INTERMEDIATE FILM FOR LAMINATED GLASS, AND LAMINATED GLASS

TECHNICAL FIELD

The present invention relates to an interlayer film for laminated glass which produces a high contrast image under light radiation, is less susceptible to color changes, and allows for control of the adhesion. The present invention further relates to a laminated glass including the interlayer film for laminated glass.

BACKGROUND ART

Laminated glass has a variety of uses, such as in front, side and rear windshields of vehicles (e.g. automobiles) and windowpanes of aircraft, buildings, and the like, because it is a form of safety glass that is less likely to scatter even when shattered by external impact. A known example of laminated glass is a laminated glass including at least a pair of glass plates integrated through, for example, an interlayer film for laminated glass which contains a liquid plasticizer and a polyvinyl acetal resin.

A recent growing need is the development of a head-up display (HUD) that presents meters showing vehicle driving data (e.g. driving speed information) within a usual range of vision in the front windshield of a vehicle.

There have been known various types of HUDs. The most typical one is a HUD that is designed such that a display unit of an instrumental panel projects information (e.g. driving speed information) sent from a control unit onto a front windshield to enable a driver to view the information at a usual viewpoint, that is, within a usual range of vision in the front windshield.

An example of laminated glass interlayer films for a HUD is a wedge-shaped laminated glass interlayer film with a predetermined wedge shape proposed in Patent Literature 1. This interlayer film can solve a HUDs' problem that a meter image displayed on a laminated glass appears double.

Patent Literature 1 also discloses a laminated glass that is partially free from the HUDs' problem that a meter image appears double. Yet, not the entire surface of the laminated glass is free from the double meter image problem.

Patent Literature 2 discloses a laminated glass including a laminate of an interlayer containing hydroxy terephthalate between two transparent plates. Patent Literature 2 also discloses a laminated glass that produces a high contrast image under light radiation. Unfortunately, in the case of such a laminated glass including an interlayer containing hydroxy terephthalate, the interlayer is susceptible to color changes.

CITATION LIST

Patent Literature

Patent Literature 1: JP H4-502525 T
Patent Literature 2: WO 2010/139889

SUMMARY OF INVENTION

Technical Problem

An object of the present invention is to provide an interlayer film for laminated glass which produces a high contrast image under light radiation, is less susceptible to color changes, and allows for control of the adhesion.

Another object of the present invention is to provide a laminated glass including the interlayer film for laminated glass.

Solution to Problem

The present invention provides an interlayer film for laminated glass which includes a light emitting layer containing a polyvinyl acetal, a light emitting material having a terephthalic acid ester structure, and a potassium salt.

The following description is offered to demonstrate the present invention.

The present inventors have found that an interlayer film for laminated glass which includes a light emitting layer containing a polyvinyl acetal, a light emitting material having a terephthalic acid ester structure, and a potassium salt produces a high contrast image under light radiation, is less susceptible to color changes, and allows for control of the adhesion. This has led to the completion of the present invention.

The interlayer film for laminated glass of the present invention includes a light emitting layer containing a polyvinyl acetal, a light emitting material having a terephthalic acid ester structure, and a potassium salt. Typically, interlayer films for laminated glass contain a magnesium element-containing compound as an adhesion control agent for controlling the adhesion of the interlayer films for laminated glass to glass. The present inventors found a problem that the use of a light emitting material having a terephthalic acid ester structure in combination with a magnesium magnesium element-containing compound results in an interlayer film for laminated glass which undergoes a color change. However, the presence of a light emitting layer containing a polyvinyl acetal, a light emitting material having a terephthalic acid ester structure, and a potassium salt allows for display of a high contrast image, prevents color changes, and allows for control of the adhesion of the interlayer film for laminated glass.

The interlayer film for laminated glass of the present invention may be a single-layered interlayer film consisting of the light emitting layer, or may be a multilayered interlayer film including the light emitting layer and a first resin layer disposed on or above one surface of the light emitting layer. The first resin layer preferably contains a polyvinyl acetal. The first resin layer may be directly disposed on one surface of the light emitting layer.

In the case where the interlayer film for laminated glass of the present invention is a multilayered interlayer film, it is preferable that the light emitting layer constitutes the outermost layers of the multilayered interlayer film. This structure allows for control of the adhesion to glass.

The light emitting layer contains a polyvinyl acetal.

The polyvinyl acetal is not particularly limited, as long as it is obtained by acetalization of polyvinyl alcohol with an aldehyde. Preferred is polyvinyl butyral. Two or more polyvinyl acetals may be used as needed.

As for the degree of acetalization of the polyvinyl acetal, the preferable lower limit is 40 mol %, the preferable upper limit is 85 mol %, the more preferable lower limit is 60 mol %, and the more preferable upper limit is 75 mol %.

As for the hydroxyl group content of the polyvinyl acetal, the preferable lower limit is 15 mol %, and the preferable upper limit is 35 mol %. When the hydroxyl group content is 15 mol % or more, the interlayer film for laminated glass can be easily formed; when the hydroxyl group content is 35 mol % or less, the interlayer film for laminated glass is easy to handle.

The degree of acetalization and the hydroxyl group content can be measured in accordance with, for example, JIS K 6728, "Testing method for polyvinyl butyral".

The polyvinyl acetal can be prepared by acetalization of polyvinyl alcohol with an aldehyde. The polyvinyl alcohol is typically prepared by saponification of polyvinyl acetate, and a polyvinyl alcohol having a degree of saponification of 70 to 99.8 mol % is generally used.

As for the degree of polymerization of the polyvinyl alcohol, the preferable lower limit is 500, and the preferable upper limit is 4000. A polyvinyl alcohol with a degree of polymerization of 500 or more provides penetration resistance to a laminated glass to be formed. In the case of a polyvinyl alcohol with a degree of polymerization of 4000 or less, the interlayer film for laminated glass can be easily formed. The more preferable lower limit of the degree of polymerization of the polyvinyl alcohol is 1000, and the more preferable upper limit is 3600.

The aldehyde is not particularly limited, and typically, a C1 to C10 aldehyde is suitable. The C1 to C10 aldehyde is not particularly limited, and examples include n-butyl aldehyde, isobutyl aldehyde, n-valeraldehyde, 2-ethyl butyl aldehyde, n-hexyl aldehyde, n-octyl aldehyde, n-nonyl aldehyde, n-decyl aldehyde, formaldehyde, acetaldehyde, and benzaldehyde. Preferred among these are n-butyl aldehyde, n-hexyl aldehyde, and n-valeraldehyde, and more preferred is n-butyl aldehyde. Any of these aldehydes may be used alone, or two or more of them may be used in combination.

The light emitting layer contains a light emitting material having a terephthalic acid ester structure.

The light emitting material having a terephthalic acid ester structure emits light under light radiation. The light radiation is not particularly limited, as long as it excites the light emitting material having a terephthalic acid ester structure to cause it to emit light. Examples include ultraviolet radiation and infrared radiation.

Examples of the light emitting material having a terephthalic acid ester structure include a compound having a structure represented by the following formula (1) and a compound having a structure represented by the following formula (2). Any of these may be used alone, or two or more of these may be used in combination.

[Chem. 1]

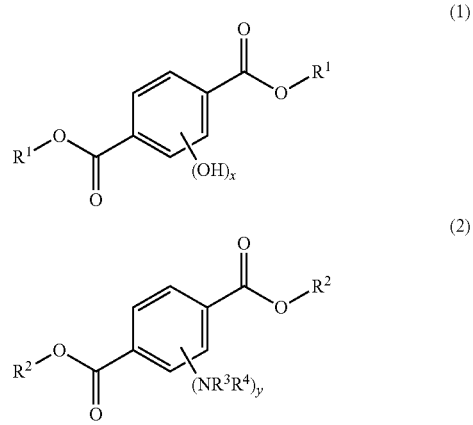

In the formula (1), $R^1$ is an organic group, and x is 1, 2, 3 or 4. In order to ensure that the interlayer film for laminated glass has much higher transparency, it is preferable that x is 1 or 2, more preferable that the benzene ring has a hydroxyl group at a 2- or 5-position, and still more preferable that the benzene ring has hydroxyl groups at the 2- and 5-positions.

The organic group of $R^1$ is preferably a hydrocarbon group, more preferably a C1 to C10 hydrocarbon group, still more preferably a C1 to C5 hydrocarbon group, and particularly preferably a C1 to C3 hydrocarbon group. In the case of a hydrocarbon group with 10 or less carbon atoms, the light emitting material having a terephthalic acid ester structure can be easily dispersed in the interlayer film for laminated glass. The hydrocarbon is preferably an alkyl group.

Examples of the compound having a structure represented by the formula (1) include diethyl-2,5-dihydroxy terephthalate and dimethyl-2,5-dihydroxy terephthalate. In particular, the compound having a structure represented by the formula (1) is preferably diethyl-2,5-dihydroxy terephthalate ("diethyl-2,5-dihydroxyterephthalate" from Aldrich) because it allows for display of an image with a much higher contrast.

In the formula (2), $R^2$ is an organic group, $R^3$ and $R^4$ are individually a hydrogen atom or an organic group, and y is 1, 2, 3 or 4.

The organic group of $R^2$ is preferably a hydrocarbon group, more preferably a C1 to C10 hydrocarbon group, still more preferably a C1 to C5 hydrocarbon group, and particularly preferably a C1 to C3 hydrocarbon group. When the carbon number of the hydrocarbon group is the upper limit or less, the light emitting material having a terephthalic acid ester structure can be easily dispersed in the interlayer film for laminated glass. The hydrocarbon is preferably an alkyl group.

In the formula (2), $NR^3R^4$ is an amino group. Preferably, $R^3$ and $R^4$ are individually a hydrogen atom. The amino group may be substituted for one of the hydrogen atoms of the benzene ring of the compound having a structure represented by the formula (2), or may be substituted for two, three, or four of the hydrogen atoms.

The compound having a structure represented by the formula (2) is preferably diethyl-2,5-diamino terephthalate (from Aldrich) because it allows for display of an image with a much higher contrast.

The amount of the light emitting material having a terephthalic acid ester structure is not particularly limited, but the preferable lower limit is 0.001 parts by weight for 100 parts by weight of the polyvinyl acetal, and the preferable upper limit is 5 parts by weight. When the amount of the light emitting material having a terephthalic acid ester structure is 0.001 parts by weight or more, the interlayer film for laminated glass can produce an image with a much higher contrast under light radiation; when the amount of the light emitting material having a terephthalic acid ester structure is 5 parts by weight or less, the interlayer film for laminated glass has much higher transparency. The more preferable lower limit of the amount of the light emitting material having a terephthalic acid ester structure is 0.005 parts by weight, the more preferable upper limit is 2 parts by weight, the still more preferable lower limit is 0.01 parts by weight, the still more preferable upper limit is 1.5 parts by weight, the particularly preferable lower limit is 0.1 parts by weight, and the particularly preferable upper limit is 1 part by weight.

The light emitting layer contains the potassium salt. The presence of the potassium salt not only facilitates control of the adhesion of the light emitting layer to glass, but also prevents color changes of the light emitting layer. The potassium salt is not particularly limited, but is preferably a C1 to C16 organic acid potassium salt, more preferably a C2 to C16 organic acid potassium salt, still more preferably a C1 to C16 carboxylic acid potassium salt, and particularly preferably a C2 to C16 carboxylic acid potassium salt. The C1 to C16 carboxylic acid potassium salt is not particularly limited, and examples include potassium formate, potassium acetate, potassium propionate, potassium 2-ethylbutanoate, and potassium 2-ethylhexanoate. Or, the C1 to C16 carboxylic acid potassium salt may be potassium acetate, potassium propionate, potassium 2-ethylbutanoate, or potassium 2-ethylhexanoate. The C1 to C16 carboxylic acid is preferably a carboxylic acid with 12 or less carbon atoms, more preferably a carboxylic acid with 10 or less carbon atoms, and still more preferably a carboxylic acid with 8 or less carbon atoms.

The term "color change" means that when the interlayer film for laminated glass is inserted between two clear glass plates (thickness: 2.5 mm), the resulting laminated glass has a YI value of more than 20. The YI value can be determined with a spectrophotometer (U-4100 from Hitachi High-Technologies Corporation) in accordance with JIS Z 8722. The YI value is preferably 20 or less, more preferably 15 or less, and still more preferably 10 or less. Also preferably, the YI value is 0 or more.

The amount of the potassium salt is not particularly limited, but the preferable lower limit is 0.001 parts by weight for 100 parts by weight of the polyvinyl acetal, and the preferable upper limit is 0.5 parts by weight. When the amount of the potassium salt is 0.001 parts by weight or more, a laminated glass with high penetration resistance can be obtained; when the amount of the potassium salt is 0.5 parts by weight or less, the interlayer film for laminated glass has higher transparency. The more preferable lower limit of the amount of the potassium salt is 0.015 parts by weight, the more preferable upper limit is 0.25 parts by weight, the still more preferable lower limit is 0.02 parts by weight, the still more preferable upper limit is 0.2 parts by weight, the particularly preferable lower limit is 0.025 parts by weight, and the particularly preferable upper limit is 0.1 parts by weight.

In order to more effectively prevent color changes of the light emitting layer, the potassium element content of the light emitting layer is preferably 400 ppm or less, more preferably 300 ppm or less, still more preferably 250 ppm or less, particularly preferably 200 ppm or less, and most preferably 180 ppm or less. In order to ensure that the light emitting layer has high moisture resistance, the potassium element content of the light emitting layer is most preferably 100 ppm or less. The potassium element may be potassium derived from the potassium salt, or may be potassium derived from a neutralizer used for the synthesis of the polyvinyl acetal. The preferable lower limit of the potassium element content of the light emitting layer is 30 ppm, the more preferable lower limit is 40 ppm, the still more preferable lower limit is 80 ppm, and the particularly preferable lower limit is 120 ppm.

The light emitting layer may contain a magnesium salt, as long as it does not prevent the objects of the present invention. The presence of a magnesium salt further facilitates control of the adhesion of the light emitting layer to glass. The magnesium salt is not particularly limited, and is preferably a C2 to C16 organic acid magnesium salt, and more preferably a C2 to C16 carboxylic acid magnesium salt. The C2 to C16 carboxylic acid magnesium salt is not particularly limited, and examples include magnesium acetate, magnesium propionate, magnesium 2-ethylbutanoate, and magnesium 2-ethylhexanoate. The C2 to C16 carboxylic acid magnesium salt is preferably magnesium acetate because it further facilitates control of the adhesion of the light emitting layer to glass.

The amount of the magnesium salt is not particularly limited, but the preferable lower limit is 0.02 parts by weight for 100 parts by weight of the polyvinyl acetal, and the preferable upper limit is 0.5 parts by weight. When the amount of the magnesium salt is 0.02 parts by weight or more, a laminated glass with high penetration resistance can be obtained; when the amount of the magnesium salt is 0.5 parts by weight or less, the interlayer film for laminated glass has high transparency. The more preferable lower limit of the amount of the magnesium salt is 0.03 parts by weight, the more preferable upper limit is 0.2 parts by weight, the still more preferable lower limit is 0.04 parts by weight, and the still more preferable upper limit is 0.1 parts by weight.

In order to further facilitate control of the adhesion of the interlayer film for laminated glass of the present invention, and to more effectively prevent color changes, the magnesium element content of the light emitting layer is preferably 80 ppm or less. The magnesium element may be magnesium derived from the magnesium salt, or may be magnesium derived from a neutralizer used for the synthesis of the polyvinyl acetal. The preferable lower limit of the magnesium element content of the light emitting layer is 0 ppm, the more preferable upper limit is 75 ppm, the more preferable lower limit is 20 ppm, the still more preferable upper limit is 70 ppm, and the still more preferable lower limit is 30 ppm. The potassium element content and the magnesium element content can be determined with an ICP emission spectrometer ("ICPE-9000" from Shimadzu Corp.).

In order to more effectively prevent color changes of the interlayer film for laminated glass, the light emitting layer preferably contains lithium element at a concentration of 25 ppm or less. The more preferable lower limit of the lithium element concentration of the light emitting layer is 0 ppm, the more preferable upper limit is 20 ppm, the still more preferable lower limit is 1 ppm, and the still more preferable upper limit is 10 ppm.

The light emitting layer preferably further contains a dispersant. The presence of a dispersant prevents the light emitting material having a terephthalic acid ester structure from aggregating, and allows for more uniform light emission. Examples of the dispersant include compounds having a sulfonic acid structure such as salts of a linear alkylbenzenesulfonic acid, compounds having an ester structure such as diester compounds, alkyl esters of recinoleic acid, phthalic acid esters, adipic acid esters, sebacic acid esters, and phosphoric acid esters, compounds having an ether structure such as polyoxyethylene glycol, polyoxypropylene glycol, and alkylphenyl-polyoxyethylene-ethers, compounds having a carboxylic acid structure such as polycarboxylic acids, compounds having an amine structure such as laurylamine, dimethyllaurylamine, oleyl propylene diamine, polyoxyethylene secondary amines, polyoxyethylene tertiary amines, and polyoxyethylene diamines, compounds having a polyamine structure such as polyalkylene polyamine alkylene oxides, compounds having an amide structure such as oleic acid diethanolamide and fatty acid alkanolamides, and compounds having a high molecular weight amide structure such as polyvinyl pyrrolidone and polyester acid amide amine salts. Other examples include high molecular weight dispersants such as polyoxyethylene alkyl ether phosphates (salts), polycarboxylic acid polymers, and condensed ricinoleic acid esters. The term "high molecular weight dispersant" is defined as referring to dispersants having a molecular weight of 10000 or higher.

In the case where the dispersant is used, the preferable lower limit of the amount of the dispersant in the light emitting layer is 1 part by weight for 100 parts by weight of the light emitting material having a terephthalic acid ester structure in the light emitting layer, and the preferable upper limit is 50 parts by weight. When the amount of the dispersant is within the range, the light emitting material having a terephthalic acid ester structure can be homogeneously dispersed in the light emitting layer. The more preferable lower limit of the amount of the dispersant is 3 parts by weight, the more preferable upper limit is 30 parts by weight, the still more preferable lower limit is 5 parts by weight, and the still more preferable upper limit is 25 parts by weight.

The light emitting layer preferably further contains an ultraviolet absorber. The presence of an ultraviolet absorber in the light emitting layer improves the lightfastness of the light emitting layer. The light emitting layer may not contain any ultraviolet absorber. In order to ensure that the interlayer film for laminated glass can produce an image with a much higher contrast, the preferable upper limit of the amount of the ultraviolet absorber in the light emitting layer is 1 part by weight for 100 parts by weight of the polyvinyl acetal, the more preferable upper limit is 0.5 parts by weight, the still more preferable upper limit is 0.2 parts by weight, and the particularly preferable upper limit is 0.1 parts by weight.

Examples of the ultraviolet absorber include compounds having an malonic acid ester structure, compounds having an oxalic anilide structure, compounds having a benzotriazole structure, compounds having a benzophenone structure, compounds having a triazine structure, compounds having a benzoate structure, and compounds having a hindered amine structure.

The light emitting layer may further contain a plasticizer as needed. The plasticizer is not particularly limited, and examples include organic ester plasticizers such as monoprotic organic acid esters and polyprotic organic acid esters, and phosphoric acid plasticizers such as organic phosphoric acid plasticizers and organic phosphorous acid plasticizers. The plasticizer is preferably a liquid plasticizer.

The monoprotic organic acid esters are not particularly limited, and examples include glycolesters obtainable by the reaction of a glycol (e.g. triethylene glycol, tetraethylene glycol, or tripropyleneglycol) and a monoprotic organic acid (e.g. butyric acid, isobutyric acid, caproic acid, 2-ethylbutyric acid, heptanoic acid, n-octylic acid, 2-ethylhexyl acid, pelargonic acid (n-nonylic acid), or decylic acid). In particular, triethylene glycol dicaproate, triethylene glycol di-2-ethylbutyrate, triethylene glycol di-n-octylate, and triethylene glycol di-2-ethylhexylate are preferable.

The polyprotic organic acid esters are not particularly limited, and examples include ester compounds of a polyprotic organic acid (e.g. adipic acid, sebacic acid, or azelaic acid) and a C4 to C8 linear or branched alcohol. In particular, dibutyl sebacate, dioctyl azelate, dibutylcarbitol adipate, and the like are preferable.

The organic ester plasticizers are not particularly limited, and examples include triethylene glycol di-2-ethyl butyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, tetraethylene glycol di-2-ethylhexanoate, dibutyl sebacate, dioctyl azelate, dibutyl carbitol adipate, ethylene glycol di-2-ethyl butyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicapriate, dihexyl adipate, dioctyl adipate, hexylcyclohexyl adipate, diisononyl adipate, heptyl nonyl adipate, dibutyl sebacate, oil-modified alkyd sebacate, mixtures of a phosphoric acid ester and an adipic acid ester, mixed adipic acid esters produced from an adipic acid ester, a C4 to C9 alkyl alcohol, and a C4 to C9 cyclic alcohol, and C6 to C8 adipic acid esters such as hexyl adipate.

The organic phosphoric acid plasticizers are not particularly limited, and examples include tributoxyethyl phosphate, isodecylphenyl phosphate, and triisopropyl phosphate.

Preferred among the plasticizers is at least one selected from the group consisting of dihexyladipate (DHA), triethylene glycol di-2-ethylhexanoate (3GO), tetraethylene glycol di-2-ethylhexanoate (4GO), triethylene glycol di-2-ethylbutylate (3GH), tetraethylene glycol di-2-ethylbutylate (4GH), tetraethylene glycol di-n-heptanoate (4G7), and triethylene glycol di-n-heptanoate (3G7).

Furthermore, the plasticizer preferably includes triethylene glycol di-2-ethylhexanoate (3GO), triethylene glycol di-2-ethylbutylate (3GH), tetraethylene glycol di-2-ethylhexanoate (4GO), and/or dihexyladipate (DHA), more preferably includes tetraethylene glycol di-2-ethylhexanoate (4GO) and/or triethylene glycol di-2-ethylhexanoate (3GO), and still more preferably includes triethylene glycol di-2-ethylhexanoate because they are less likely to undergo hydrolysis.

The amount of the plasticizer in the light emitting layer is not particularly limited, but the preferable lower limit is 20 parts by weight for 100 parts by weight of the polyvinyl acetal, and the preferable upper limit is 80 parts by weight. When the amount of the plasticizer is 20 parts by weight or more, the interlayer film for laminated glass has low melt viscosity, which facilitates formation of the interlayer film for laminated glass; when the amount of the plasticizer is 80 parts by weight or less, the interlayer film for laminated glass has high transparency. The more preferable lower limit of the amount of the plasticizer is 30 parts by weight, the more preferable upper limit is 70 parts by weight, the still more preferable lower limit is 35 parts by weight, and the still more preferable upper limit is 63 parts by weight.

The light emitting layer may contain additives such as an antioxidant, a photostabilizer, an antistatic agent, a blue dye, a blue pigment, a green dye, and/or a green pigment as needed.

The light emitting layer preferably contains an antioxidant because it provides high lightfastness. The antioxidant is not particularly limited, and examples include antioxidants having a phenolic structure, sulfur-containing antioxidants, and phosphorus-containing antioxidants.

The antioxidants having a phenolic structure are intended to include antioxidants having a phenolic backbone. Examples of the antioxidants having a phenolic structure include 2,6-di-t-butyl-p-cresol (BHT), butylated hydroxyanisole (BHA), 2,6-di-t-butyl-4-ethylphenol, stearyl-β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, and pentaerythritoltetrakis[3-(3,5- di-tert-butyl-4-hydroxyphenyl)propionate]. Any of the antioxidants may be used alone, or two or more of these may be used in combination.

The thickness of the light emitting layer is not particularly limited, but the preferable lower limit is 300 μm, and the preferable upper limit is 2000 μm. When the thickness of the light emitting layer is within this range, the light emitting layer emits light with sufficiently high contrast under radiation of light at specific wavelengths. The more preferable lower limit of the thickness of the light emitting layer is 350 μm, and the more preferable upper limit is 1000 μm.

The light emitting layer may extend over all the surfaces of the interlayer film for laminated glass of the present invention, or over a part of the surfaces, or may extend over an entire surface that is perpendicular to the thickness direction of the interlayer film for laminated glass of the present invention, or over a part of the surface. In the case where the light emitting layer extends over a part of a surface, the covered part functions as a light emitting area, and the other part functions as a non-light emitting area, so that information can be displayed only in the light emitting area.

The interlayer film for laminated glass of the present invention may further be provided with a first resin layer on or above one surface of the light emitting layer. The first resin layer preferably contains a polyvinyl acetal, more preferably contains a polyvinyl acetal and a plasticizer, and still more preferably contains a polyvinyl acetal, a plasticizer, and an adhesion control agent. Other layer(s) may further be laminated on the light emitting layer and the first resin layer. Examples of the other layer(s) include a layer made of a thermoplastic resin such as polyethylene terephthalate or a polyvinyl acetal. The other layer(s) may be an ultraviolet shielding coat layer containing an ultraviolet absorber. The ultraviolet absorber used in the ultraviolet shielding coat layer may be the same ultraviolet absorber as that used in the light emitting layer.

The polyvinyl acetal in the light emitting layer may be used as the polyvinyl acetal in the first resin layer. The polyvinyl acetal in the first resin layer may be the same as or different from the polyvinyl acetal in the light emitting layer. In the case where the light emitting layer contains a plasticizer, the first resin layer may contain the same plasticizer as or a different plasticizer from that in the light emitting layer.

The first resin layer preferably contains an adhesion control agent. The adhesion control agent is not particularly limited. Preferred are metal salts, and at least one metal salt selected from the group consisting of alkali metal salts, alkaline earth metal salts, and magnesium salts is more preferable. The metal salt preferably contains at least one of potassium and magnesium. The metal salt is more preferably an alkali metal salt of a C2 to C16 organic acid or an alkaline earth metal salt of a C2 to C16 organic acid, and still more preferably a C2 to C16 carboxylic acid magnesium salt or a C2 to C16 carboxylic acid potassium salt. The C2 to C16 carboxylic acid magnesium salt and the C2 to C16 carboxylic acid potassium salt are not particularly limited. Preferred examples include magnesium acetate, potassium acetate, magnesium propionate, potassium propionate, magnesium 2-ethylbutanoate, potassium 2-ethylbutanoate, magnesium 2-ethylhexanonate, and potassium 2-ethylhexanoate.

The amount of the adhesion control agent is not particularly limited, and the preferable lower limit is 0.0005 parts by weight for 100 parts by weight of the polyvinyl acetal, and the preferable upper limit is 0.05 parts by weight. When the amount of the adhesion control agent is 0.0005 parts by weight or more, a laminated glass having higher penetration resistance can be obtained; when the amount of the adhesion control agent is 0.05 parts by weight or less, the interlayer film for laminated glass has high transparency. The more preferable lower limit of the amount of the adhesion control agent is 0.002 parts by weight, and the more preferable upper limit is 0.02 parts by weight.

The total amount of alkali metals, alkaline earth metals, and magnesium in the first resin layer is preferably 300 ppm or less in order to ensure that the first resin layer has high moisture resistance. For example, the alkali metals, alkaline earth metals, and magnesium may be metals derived from the adhesion control agent, or may be metals derived from a neutralizer used for the synthesis of the polyvinyl acetal. The total amount of alkali metals, alkaline earth metals, and magnesium in the first resin layer is more preferably 200 ppm or less, still more preferably 150 ppm or less, and particularly preferably 100 ppm or less.

In the case where the interlayer film for laminated glass of the present invention is required to have heat shielding properties, either the light emitting layer or the first resin layer, or both of them may contain a heat wave absorbing agent. Alternatively, a heat wave shielding layer containing a heat wave absorbing agent may further be laminated in addition to the light emitting layer and the first resin layer.

The heat wave absorbing agent is not particularly limited, as long as it shields infrared rays. Preferred is at least one selected from the group consisting of tin-doped indium oxide (ITO) particles, antimony-doped tin oxide (ATO) particles, aluminum-doped zinc oxide (AZO) particles, indium-doped zinc oxide (IZO) particles, tin-doped zinc oxide particles, silicon-doped zinc oxide particles, lanthanum hexaboride particles, and cerium hexaboride particles.

The interlayer film for laminated glass of the present invention may further include a sound insulation layer in order to improve the sound insulation properties. Either the light emitting layer or the first resin layer may have sound insulation properties to function as a sound insulation layer. Alternatively, a sound insulation layer may further be laminated in addition to the light emitting layer and the first resin layer.

The sound insulation layer may be, for example, a layer containing the plasticizer in an amount of 50 to 80 parts by weight for 100 parts by weight of the polyvinyl acetal. The sound insulation layer preferably contains a polyvinyl acetal, and more preferably contains polyvinyl butyral. As for the polyvinyl acetal in the sound insulation layer, the hydroxyl group content is preferably in the range of 20 to 28 mol %. The polyvinyl acetal in the sound insulation layer may be polyvinyl acetal A having an acetyl group content of 8 to 30 mol %, polyvinyl acetal B having an acetyl group content of more than 0 mol % and less than 5 mol % and a degree of acetalization of 70 to 85 mol %, or polyvinyl acetal C having an acetyl group content of 5 mol % or more and less than 8 mol % and a degree of acetalization of 65 to 80 mol %.

Preferably, in the interlayer film for laminated glass of the present invention, the light emitting layer (as a surface layer), the first resin layer (as an intermediate layer), and the light emitting layer (as a surface layer) are laminated in the stated order, for example. In the case where the light emitting layers constitute the surface layers of the interlayer film for laminated glass, the interlayer film for laminated glass can produce a high contrast image, is less susceptible to color changes, and allows for control of the adhesion. In the case where the first resin layer has sound insulation properties, the interlayer film for laminated glass has improved sound insulation properties.

In order to ensure that the interlayer film for laminated glass of the present invention has sound insulation properties, the amount (hereinafter, also referred to as amount X) of the plasticizer in the first resin layer relative to 100 parts by weight of the polyvinyl acetal in the first resin layer is preferably larger than the amount (hereinafter, also referred to as amount Y) of the plasticizer in the light emitting layer relative to 100 parts by weight of the polyvinyl acetal in the light emitting layer. The amount X is preferably larger than the amount Y by 5 parts by weight or more, more preferably by 10 parts by weight or more, and still more preferably by 15 parts by weight or more. In order to ensure that the interlayer film for laminated glass has much higher penetration resistance, the difference between the amount X and the amount Y is preferably 50 parts by weight or less, more preferably 40 parts by weight or less, and still more preferably 35 parts by weight or less. The difference between the amount X and the amount Y is determined by the following formula:

(Difference between amount $X$ and amount $Y$)= (Amount $X$−Amount $Y$).

In the case where the following conditions are satisfied: the light emitting layer and the first resin layer contain the polyvinyl acetal and the plasticizer; and the light emitting layer is disposed on or above both one surface of the first resin layer and the other surface of the first resin layer opposite to the one surface, the hydroxyl group content (hereinafter, also referred to as hydroxyl group content X) of the polyvinyl acetal in the first resin layer is preferably less than the hydroxyl group content (hereinafter, also referred to as hydroxyl group content Y) of the polyvinyl acetal in the light emitting layer. When the hydroxyl group content X is less than the hydroxyl group content Y, the plasticizer in the first resin layer is prevented from migrating to the light emitting layer. As a result, the sound insulation properties of the interlayer film for laminated glass can be improved.

The hydroxyl group content X is more preferably less than the hydroxyl group content Y by 1 mol % or more, still more preferably by 3 mol % or more, and particularly preferably by 5 mol % or more. In order to facilitate formation of the interlayer film for laminated glass, the preferable upper limit of the difference between the hydroxyl group content X and the hydroxyl group content Y is 20 mol %, the more preferable upper limit is 15 mol %, the still more preferable upper limit is 12 mol %, and the particularly preferable upper limit is 10 mol %. The difference between the hydroxyl group content X and the hydroxyl group content Y is determined by the following formula:

(Difference between hydroxyl group content $X$ and hydroxyl group content $Y$)=(hydroxyl group content $Y$−hydroxyl group content $X$).

In order to prevent the plasticizer from migrating from the first resin layer to the light emitting layer, and to prevent the light emitting material having a terephthalic acid ester structure from migrating from the light emitting layer to the first resin layer, a layer for preventing the plasticizer or the light emitting material having a terephthalic acid ester structure from migrating may be disposed between the light emitting layer and the first resin layer. Examples of the layer for preventing migration include a resin layer containing a polyalkylene terephthalate such as polyethylene terephthalate.

The preferable lower limit of the hydroxyl group content X is 10 mol %, the more preferable lower limit is 15 mol %, the still more preferable lower limit is 18 mol %, and the particularly preferable lower limit is 20 mol %. The preferable upper limit of the hydroxyl group content X is 32 mol %, the more preferable upper limit is 30 mol %, the still more preferable upper limit is 28 mol %, and the particularly preferable upper limit is 25 mol %. When the hydroxyl group content X is the lower limit or more, the interlayer film for laminated glass has high penetration resistance; when the content is the upper limit or less, the first resin layer can be easily formed. The preferable lower limit of the hydroxyl group content Y is 26 mol %, the more preferable lower limit is 28 mol %, the still more preferable lower limit is 30 mol %, the preferable upper limit is 40 mol %, the more preferable upper limit is 36 mol %, the still more preferable upper limit is 34 mol %, and the particularly preferable upper limit is 32 mol %. When the hydroxyl group content Y is the lower limit or more, the interlayer film for laminated glass has high penetration resistance; when the content is the upper limit or less, the light emitting layer can be easily formed.

The interlayer film for laminated glass of the present invention can be formed by any method without particular limitation, and examples include a method for forming an interlayer film for laminated glass which involves using a plasticizer solution prepared by mixing the plasticizer, the light emitting material having a terephthalic acid ester structure, and the potassium salt, and a resin composition containing the polyvinyl acetal. Preferably, the obtained resin composition is sufficiently mixed and then extruded with an extruder into an interlayer film for laminated glass. The plasticizer solution prepared by mixing the plasticizer, the light emitting material having a terephthalic acid ester structure, and the potassium salt, and the resin composition containing the polyvinyl acetal may be coextruded with a resin composition containing the polyvinyl acetal and the plasticizer to form a multilayered interlayer film including the light emitting layer, the first resin layer, and the light emitting layer.

Because of the light emitting layer, the interlayer film for laminated glass of the present invention emits light under radiation of light at specific wavelengths. This feature allows for display of information with a high contrast.

Examples of devices for radiation of light at specific wavelengths include a spot light source (LC-8 from Hamamatsu Photonics K.K.), a xenon flush lamp (CW lamp from Heraeus), and a black light (Carry Hand from Iuchi Seieido Co., Ltd.).

A laminated glass including the interlayer film for laminated glass of the present invention between a pair of glass plates is also one aspect of the present invention.

The glass plates may be common transparent glass plates. Examples include plates of inorganic glasses such as float glass plate, polished glass plate, figured glass plate, meshed glass plate, wired glass plate, colored glass plate, heat-absorbing glass plate, heat-reflecting glass plate, and green glass plate. An ultraviolet shielding glass plate including an ultraviolet shielding coat layer on a glass surface may also be used. However, this glass plate is preferably used on the side opposite to the side to be exposed to radiation of light at specific wavelengths. Further examples of the glass plates include organic plastic plates made of polyethylene terephthalate, polycarbonate, polyacrylate, or the like.

The glass plates may include two or more types of glass plates. For example, the laminated glass may be a laminate including the interlayer film for laminated glass of the present invention between a transparent float glass plate and a colored glass plate such as a green glass plate. The glass plates may include two or more glass plates with a different thickness.

Advantageous Effects of Invention

The present invention provides an interlayer film for laminated glass which produces a high contrast image under light radiation, is less susceptible to color changes, and allows for control of the adhesion. The present invention further provides a laminated glass including the interlayer film for laminated glass.

DESCRIPTION OF EMBODIMENTS

The following examples are offered to demonstrate the present invention, but are not to be construed as limiting the present invention.

Example 1

(1) Resin Composition for Light Emitting Layer

A light-emissive plasticizer solution was prepared by mixing 0.2 parts by weight of diethyl-2,5-dihydroxy terephthalate ("diethyl-2,5-dihydroxyterephthalate" from Aldrich), which corresponds to the compound having a structure represented by the formula (1), as the light emitting material having a terephthalic acid ester structure, and 0.056 parts by weight of potassium acetate as the potassium salt with 40 parts by weight of triethyleneglycol di-2-ethylhexanoate (3GO). The entire amount of the plasticizer solution was combined with 100 parts by weight of polyvinyl butyral (acetyl group content: 0.9 mol %, hydroxyl group content: 30.6 mol %, degree of butyralization: 68.5 mol %) obtained by acetalization of a polyvinyl alcohol (degree of polymerization: 1700) with n-butylaldehyde. The resulting mixture was sufficiently kneaded with mixing rolls. In this manner, a resin composition for a light emitting layer was prepared.

(2) Formation of Interlayer Film for Laminated Glass

An interlayer film for laminated glass (30 cm (length)×15 cm (width)) consisting of a light emitting layer was formed by extrusion of the resin composition for a light emitting layer from an extruder. The thickness of the interlayer film for laminated glass was 800 μm.

(3) Production of Laminated Glass

The interlayer film for laminated glass was inserted between a pair of 30 cm (length)×15 cm (width) clear glass plates (thickness: 2.5 mm) to prepare a laminate. Pressure bonding was carried out by vacuum pressing of the laminate with a vacuum laminator at 90° C. for 30 minutes. After pressure bonding, the laminate was further pressure bonded in an autoclave at 140° C. at 14 MPa for 20 minutes. In this manner, a laminated glass was obtained.

Examples 2 to 19 and Comparative Example 1

An interlayer film for laminated glass and a laminated glass were obtained in the same manner as in Example 1, except that the composition was changed as shown in Tables 1 and 2.

Example 20

(1) Resin Composition for Surface Layer

A light-emissive plasticizer solution was prepared by mixing 0.6 parts by weight of diethyl-2,5-dihydroxy terephthalate ("diethyl-2,5-dihydroxyterephthalate" from Aldrich), which corresponds to the compound having a structure represented by the formula (1), as the light emitting material having a terephthalic acid ester structure, and 0.056 parts by weight of potassium acetate as the potassium salt with 40 parts by weight of triethyleneglycol di-2-ethylhexanoate (3GO). The entire amount of the plasticizer solution was combined with 100 parts by weight of polyvinyl butyral (acetyl group content: 0.9 mol %, hydroxyl group content: 30.6 mol %, degree of butyralization: 68.5 mol %) obtained by acetalization of a polyvinyl alcohol (degree of polymerization: 1700) with n-butylaldehyde. The resulting mixture was sufficiently kneaded with mixing rolls. In this manner, a resin composition for a surface layer was prepared.

(2) Resin Composition for Intermediate Layer

A resin composition for an intermediate layer was prepared by sufficiently kneading 60 parts by weight of triethyleneglycol di-2-ethylhexanoate (3GO) with 100 parts by weight of polyvinyl butyral (acetyl group content: 13 mol %, hydroxyl group content: 22 mol %, degree of butyralization: 65 mol %) obtained by acetalization of a polyvinyl alcohol (degree of polymerization: 2300) with n-butylaldehyde with mixing rolls.

(3) Formation of Interlayer Film for Laminated Glass

The resin composition for a surface layer and the resin composition for an intermediate layer were extruded from a coextruder to form an interlayer film for laminated glass (30 cm (length)×15 cm (width)) including three layers: a surface layer (thickness: 350 μm)/an intermediate layer (thickness: 100 μm)/a surface layer (thickness: 350 μm). The thickness of the interlayer film for laminated glass was 800 μm.

(4) Production of Laminated Glass

The interlayer film for laminated glass was inserted between a pair of 30 cm (length)×15 cm (width) clear glass plates (thickness: 2.5 mm) to prepare a laminate. Pressure bonding was carried out by vacuum pressing of the laminate with a vacuum laminator at 90° C. for 30 minutes. After pressure bonding, the laminate was further pressure bonded in an autoclave at 140° C. at 14 MPa for 20 minutes. In this manner, a laminated glass was obtained.

Examples 21 to 42 and Comparative Examples 2, 3

An interlayer film for laminated glass and a laminated glass were obtained in the same manner as in Example 20, except that the compositions of the surface layers and the intermediate layer were changed as shown in Tables 3 to 7.

(Evaluation)

The laminated glasses obtained in the examples and comparative examples were evaluated as follows. Tables 1 to 7 show the results.

(1) Evaluation of Light Emission

An entire surface of each of the laminated glasses was irradiated with light from a high power xenon light source ("REX-250" from Asahi Spectra Co., Ltd., emission at 405 nm) in a dark room. The laminated glasses were visually observed, and those emitting light from a center portion thereof were given a rating of "O", and those which did not emit light were given a rating of "x". The entire surface of each laminated glass was further irradiated in a dark room with light from the high power xenon light source ("REX-250" from Asahi Spectra Co., Ltd., emission at 405 nm) that was spaced 10 cm from the laminated glass surface in the perpendicular direction, and measured for luminance with a luminance meter ("SR-3AR" from TOPCON TECHNO-HOUSE CORPORATION) that was positioned on the side being irradiated with light at an angle of 45 degrees with respect to the laminated glass surface being irradiated with light, and spaced a minimum distance of 35 cm from the laminated glass surface.

(2) Evaluation of Color Change

The laminated glasses (5 cm (length)×5 cm (width)) were measured for the yellow index value (YI value) with a spectrophotometer (U-4100 from Hitachi High-Technologies Corporation) in accordance with JIS Z 8722. Their yellow index values (YI values) were evaluated as follows: when the YI value is 0 or more and 20 or less, a rating of "0" was given; and when the YI value is more than 20, a rating of "x" was given.

(3) Evaluation of Adhesion (Measurement of Pummel Value of Interlayer Film for Laminated Glass)

The laminated glasses obtained in the examples and comparative examples were left standing at −18° C.±0.6° C. for 16 hours, and a center portion (150 mm (length)×150 mm (width)) of each laminated glass was shattered with a hammer having a 0.45 kg head into glass pieces with a size of 6 mm or smaller. Areas of the films from which glass pieces fell off were measured for exposure degree, and a pummel value was assigned based on the classifications indicated in Table 8. A pummel value of 2 to 9 was evaluated as "○", and a pummel value of 1 or less or of 10 was evaluated as "x". The pummel values are also shown.

TABLE 1

| | | | | Example 1 | Example 2 | Example 3 | Example 4 | Example 5 |
|---|---|---|---|---|---|---|---|---|
| Light emitting layer | | Polyvinyl butyral | Parts by weight | 100 | 100 | 100 | 100 | 100 |
| | | | Degree of polymerization | 1700 | 1700 | 1700 | 1700 | 1700 |
| | | | Hydroxyl group content (mol %) | 30.6 | 30.6 | 30.6 | 30.6 | 30.6 |
| | | | Degree of butyralization (mol %) | 68.5 | 68.5 | 68.5 | 68.5 | 68.5 |
| | | | Acetyl group content (mol %) | 0.9 | 0.9 | 0.9 | 0.9 | 0.9 |
| | | Plasticizer (3GO) | Parts by weight | 40 | 40 | 40 | 40 | 40 |
| | Light emitting material having terephthalic acid ester structure | Diethyl-2,5-dihydroxy terephthalate | Parts by weight | 0.2 | 0.2 | 0.2 | 0.2 | 0.2 |
| | | Dimethyl-2,5-dihydroxy terephthalate | Parts by weight | 0 | 0 | 0 | 0 | 0 |
| | | Diethyl-2,5-diamino terephthalate | Parts by weight | 0 | 0 | 0 | 0 | 0 |
| | Potassium salt | Potassium acetate | Parts by weight | 0.056 | 0.084 | 0.028 | 0.042 | 0.056 |
| | | Potassium 2-ethylhexanoate | Parts by weight | 0 | 0 | 0.052 | 0.078 | 0 |
| | | Potassium formate | Parts by weight | 0 | 0 | 0 | 0 | 0 |
| | | Potassium propionate | Parts by weight | 0 | 0 | 0 | 0 | 0 |
| | Magnesium salt | Magnesium acetate tetrahydrate | Parts by weight | 0 | 0 | 0 | 0 | 0.049 |
| | | Potassium concentration | ppm | 160 | 240 | 160 | 240 | 160 |
| | | Magnesium concentration | ppm | 0 | 0 | 0 | 0 | 40 |
| | | Thickness of light emitting layer | μm | 800 | 800 | 800 | 800 | 800 |
| Evaluation | | Light emission | Evaluation | ○ | ○ | ○ | ○ | ○ |
| | | | Luminance (cd/m$^2$) | 750 | 753 | 751 | 755 | 745 |
| | | Color change | Evaluation | ○ | ○ | ○ | ○ | ○ |
| | | | Initial YI | 7 | 7 | 7 | 7 | 10 |
| | | Adhesion | Evaluation | ○ | ○ | ○ | ○ | ○ |
| | | | Pummel value | 4 | 3 | 5 | 4 | 4 |

| | | | | Example 6 | Example 7 | Example 8 | Example 9 | Example 10 |
|---|---|---|---|---|---|---|---|---|
| Light emitting layer | | Polyvinyl butyral | Parts by weight | 100 | 100 | 100 | 100 | 100 |
| | | | Degree of polymerization | 1700 | 1700 | 1700 | 1700 | 1700 |
| | | | Hydroxyl group content (mol %) | 30.6 | 30.6 | 30.6 | 30.6 | 30.7 |
| | | | Degree of butyralization (mol %) | 68.5 | 68.5 | 68.5 | 68.5 | 68.5 |
| | | | Acetyl group content (mol %) | 0.9 | 0.9 | 0.9 | 0.9 | 0.8 |
| | | Plasticizer (3GO) | Parts by weight | 40 | 40 | 40 | 40 | 40 |
| | Light emitting material having terephthalic acid ester structure | Diethyl-2,5-dihydroxy terephthalate | Parts by weight | 0.2 | 0.2 | 0.2 | 0.2 | 0.2 |
| | | Dimethyl-2,5-dihydroxy terephthalate | Parts by weight | 0 | 0 | 0 | 0 | 0 |
| | | Diethyl-2,5-diamino terephthalate | Parts by weight | 0 | 0 | 0 | 0 | 0 |
| | Potassium salt | Potassium acetate | Parts by weight | 0.056 | 0.056 | 0.018 | 0.11 | 0.056 |
| | | Potassium 2-ethylhexanoate | Parts by weight | 0 | 0 | 0 | 0 | 0 |
| | | Potassium formate | Parts by weight | 0 | 0 | 0 | 0 | 0 |
| | | Potassium propionate | Parts by weight | 0 | 0 | 0 | 0 | 0 |
| | Magnesium salt | Magnesium acetate tetrahydrate | Parts by weight | 0.074 | 0.025 | 0 | 0 | 0 |

TABLE 1-continued

|  |  |  |  |  |  |  |  |
|---|---|---|---|---|---|---|---|
|  |  | Potassium concentration | ppm | 160 | 160 | 50 | 300 | 160 |
|  |  | Magnesium concentration | ppm | 60 | 20 | 0 | 0 | 0 |
|  |  | Thickness of light emitting layer | μm | 800 | 800 | 800 | 800 | 800 |
| Evaluation |  | Light emission | Evaluation | ○ | ○ | ○ | ○ | ○ |
|  |  |  | Luminance (cd/m$^2$) | 735 | 748 | 750 | 758 | 751 |
|  |  | Color change | Evaluation | ○ | ○ | ○ | ○ | ○ |
|  |  |  | Initial YI | 14 | 8.5 | 7 | 7 | 7 |
|  |  | Adhesion | Evaluation | ○ | ○ | ○ | ○ | ○ |
|  |  |  | Pummel value | 3 | 4 | 7 | 2 | 4 |

TABLE 2

|  |  |  |  | Example 11 | Example 12 | Example 13 | Example 14 | Example 15 |
|---|---|---|---|---|---|---|---|---|
| Light emitting layer |  | Polyvinyl butyral | Parts by weight | 100 | 100 | 100 | 100 | 100 |
|  |  |  | Degree of polymerization | 1700 | 1700 | 1700 | 1700 | 1700 |
|  |  |  | Hydroxyl group content (mol %) | 29.9 | 30.6 | 30.6 | 30.6 | 30.6 |
|  |  |  | Degree of butyralization (mol %) | 68.5 | 68.5 | 68.5 | 68.5 | 68.5 |
|  |  |  | Acetyl group content (mol %) | 1.6 | 0.9 | 0.9 | 0.9 | 0.9 |
|  |  | Plasticizer (3GO) | Parts by weight | 40 | 40 | 40 | 40 | 40 |
|  | Light emitting material having terephthalic acid ester structure | Diethyl-2,5-dihydroxy terephthalate | Parts by weight | 0.2 | 0 | 0 | 0.2 | 0.2 |
|  |  | Dimethyl-2,5-dihydroxy terephthalate | Parts by weight | 0 | 0.2 | 0.8 | 0 | 0 |
|  |  | Diethyl-2,5-diamino terephthalate | Parts by weight | 0 | 0 | 0 | 0 | 0 |
|  | Potassium salt | Potassium acetate | Parts by weight | 0.056 | 0.056 | 0.056 | 0 | 0 |
|  |  | Potassium 2-ethylhexanoate | Parts by weight | 0 | 0 | 0 | 0 | 0 |
|  |  | Potassium formate | Parts by weight | 0 | 0 | 0 | 0.047 | 0 |
|  |  | Potassium propionate | Parts by weight | 0 | 0 | 0 | 0 | 0.063 |
|  | Magnesium salt | Magnesium acetate tetrahydrate | Parts by weight | 0 | 0 | 0 | 0 | 0 |
|  |  | Potassium concentration | ppm | 160 | 160 | 160 | 160 | 160 |
|  |  | Magnesium concentration | ppm | 0 | 0 | 0 | 0 | 0 |
|  |  | Thickness of light emitting layer | μm | 800 | 800 | 800 | 800 | 800 |
| Evaluation |  | Light emission | Evaluation | ○ | ○ | ○ | ○ | ○ |
|  |  |  | Luminance (cd/m$^2$) | 752 | 756 | 950 | 754 | 759 |
|  |  | Color change | Evaluation | ○ | ○ | ○ | ○ | ○ |
|  |  |  | Initial YI | 7 | 7 | 7 | 7 | 7 |
|  |  | Adhesion | Evaluation | ○ | ○ | ○ | ○ | ○ |
|  |  |  | Pummel value | 4 | 4 | 4 | 4 | 4 |

|  |  |  |  | Example 16 | Example 17 | Example 18 | Example 19 | Comparative Example 1 |
|---|---|---|---|---|---|---|---|---|
| Light emitting layer |  | Polyvinyl butyral | Parts by weight | 100 | 100 | 100 | 100 | 100 |
|  |  |  | Degree of polymerization | 1700 | 1700 | 1700 | 1700 | 1700 |
|  |  |  | Hydroxyl group content (mol %) | 30.6 | 30.6 | 30.6 | 30.6 | 30.6 |
|  |  |  | Degree of butyralization (mol %) | 68.5 | 68.5 | 68.5 | 68.5 | 68.5 |
|  |  |  | Acetyl group content (mol %) | 0.9 | 0.9 | 0.9 | 0.9 | 0.9 |
|  |  | Plasticizer (3GO) | Parts by weight | 40 | 40 | 40 | 40 | 40 |
|  | Light emitting material having terephthalic acid ester structure | Diethyl-2,5-dihydroxy terephthalate | Parts by weight | 0.5 | 0.8 | 0 | 0 | 0.2 |
|  |  | Dimethyl-2,5-dihydroxy terephthalate | Parts by weight | 0 | 0 | 0 | 0 | 0 |
|  |  | Diethyl-2,5-diamino terephthalate | Parts by weight | 0 | 0 | 0.2 | 0.8 | 0 |
|  | Potassium salt | Potassium acetate | Parts by weight | 0.056 | 0.056 | 0.056 | 0.056 | 0 |
|  |  | Potassium 2-ethylhexanoate | Parts by weight | 0 | 0 | 0 | 0 | 0 |
|  |  | Potassium formate | Parts by weight | 0 | 0 | 0 | 0 | 0 |
|  |  | Potassium propionate | Parts by weight | 0 | 0 | 0 | 0 | 0 |
|  | Magnesium salt | Magnesium acetate tetrahydrate | Parts by weight | 0 | 0 | 0 | 0 | 0.11 |
|  |  | Potassium concentration | ppm | 160 | 160 | 160 | 160 | 0 |
|  |  | Magnesium concentration | ppm | 0 | 0 | 0 | 0 | 90 |
|  |  | Thickness of light emitting layer | μm | 800 | 800 | 800 | 800 | 800 |

TABLE 2-continued

|  |  |  |  |  |  |  |  |
|---|---|---|---|---|---|---|---|
| Evaluation | Light emission | Evaluation | ○ | ○ | ○ | ○ | ○ |
|  |  | Luminance (cd/m$^2$) | 920 | 1000 | 732 | 935 | 725 |
|  | Color change | Evaluation | ○ | ○ | ○ | ○ | X |
|  |  | Initial YI | 7 | 7 | 7 | 7 | 21 |
|  | Adhesion | Evaluation | ○ | ○ | ○ | ○ | ○ |
|  |  | Pummel value | 4 | 4 | 4 | 4 | 4 |

TABLE 3

|  |  |  |  | Example 20 | Example 21 | Example 22 | Example 23 | Example 24 |
|---|---|---|---|---|---|---|---|---|
| Intermediate layer | Polyvinyl butyral |  | Parts by weight | 100 | 100 | 100 | 100 | 100 |
|  |  |  | Degree of polymerization | 2300 | 2300 | 2300 | 2300 | 2300 |
|  |  |  | Hydroxyl group content (mol %) | 22 | 22 | 22 | 22 | 22 |
|  |  |  | Degree of butyralization (mol %) | 65 | 65 | 65 | 65 | 65 |
|  |  |  | Acetyl group content (mol %) | 13 | 13 | 13 | 13 | 13 |
|  | Plasticizer (3GO) |  | Parts by weight | 60 | 60 | 60 | 60 | 60 |
|  | Potassium acetate |  | Parts by weight | 0 | 0 | 0 | 0 | 0 |
|  | Potassium 2-ethylhexanoate |  | Parts by weight | 0 | 0 | 0 | 0 | 0 |
|  | Potassium formate |  | Parts by weight | 0 | 0 | 0 | 0 | 0 |
|  | Potassium propionate |  | Parts by weight | 0 | 0 | 0 | 0 | 0 |
|  | Magnesium acetate tetrahydrate |  | Parts by weight | 0 | 0 | 0 | 0 | 0 |
|  | Light emitting material having terephthatlc acid ester structure | Diethyl-2,5-dihydroxy terephthalate | Parts by weight | 0 | 0 | 0 | 0 | 0 |
|  |  | Dimethyl-2,5-dihydroxy terephthalate | Parts by weight | 0 | 0 | 0 | 0 | 0 |
|  | Potassium concentration |  | ppm | 0 | 0 | 0 | 0 | 0 |
|  | Magnesium concentration |  | ppm | 0 | 0 | 0 | 0 | 0 |
|  | Thickness of Intermediate layer |  | μm | 100 | 100 | 100 | 100 | 100 |
| Surface layer | Polyvinyl butyral |  | Parts by weight | 100 | 100 | 100 | 100 | 100 |
|  |  |  | Degree of polymerization | 1700 | 1700 | 1700 | 1700 | 1700 |
|  |  |  | Hydroxyl group content (mol %) | 30.6 | 30.6 | 30.6 | 30.6 | 30.6 |
|  |  |  | Degree of butyralization (mol %) | 68.6 | 68.5 | 68.5 | 68.5 | 68.5 |
|  |  |  | Acetyl group content (mol %) | 0.8 | 0.8 | 0.9 | 0.9 | 0.8 |
|  | Plasticizer (3GO) |  | Parts by weight | 40 | 40 | 40 | 40 | 40 |
|  | Adhesion control agent | Potassium acetate | Parts by weight | 0.056 | 0 | 0 | 0.056 | 0.084 |
|  |  | Potassium 2-ethylhexanoate | Parts by weight | 0 | 0 | 0 | 0 | 0 |
|  |  | Potassium formate | Parts by weight | 0 | 0.047 | 0 | 0 | 0 |
|  |  | Potassium propionate | Parts by weight | 0 | 0 | 0.063 | 0 | 0 |
|  |  | Magnesium acetate tetrahydrate | Parts by weight | 0 | 0 | 0 | 0.049 | 0 |
|  | Light emitting material having terephthalic acid ester structure | Diethyl-2,5-dihydroxy terephthalate | Parts by weight | 0.6 | 0.6 | 0.6 | 0.6 | 0.6 |
|  |  | Dimethyl-2,5-dihydroxy terephthalate | Parts by weight | 0 | 0 | 0 | 0 | 0 |
|  | Potassium concentration |  | ppm | 160 | 160 | 160 | 160 | 240 |
|  | Magnesium concentration |  | ppm | 0 | 0 | 0 | 40 | 0 |
|  | Thickness of surface layer |  | μm | 350 | 360 | 350 | 350 | 350 |
| Evaluation | Evaluation of light emission |  | Luminance (cd/m$^2$) | 925 | 923 | 935 | 920 | 940 |
|  | Evaluation of color change |  | Initial YI | 7 | 7 | 7 | 10 | 7 |
|  | Evaluation of adhesion |  | Pummel value | 4 | 4 | 4 | 4 | 3 |

TABLE 4

|  |  |  |  | Example 25 | Example 26 | Example 27 | Example 28 | Example 29 |
|---|---|---|---|---|---|---|---|---|
| Intermediate layer | Polyvinyl butyral |  | Parts by weight | 100 | 100 | 100 | 100 | 100 |
|  |  |  | Degree of polymerization | 2300 | 2300 | 2300 | 2300 | 2300 |
|  |  |  | Hydroxyl group content (mol %) | 22 | 22 | 22 | 22 | 22 |
|  |  |  | Degree of butyralization (mol %) | 65 | 65 | 65 | 65 | 65 |

TABLE 4-continued

|  |  |  |  |  |  |  |  |  |
|---|---|---|---|---|---|---|---|---|
|  |  |  | Acetyl group content (mol %) |  | 13 | 13 | 13 | 13 | 13 |
|  |  | Plasticizer (3GO) | Parts by weight | 60 | 60 | 60 | 60 | 60 |
|  |  | Potassium acetate | Parts by weight | 0 | 0 | 0 | 0 | 0.028 |
|  |  | Potassium 2-ethylhexanoate | Parts by weight | 0 | 0 | 0 | 0 | 0 |
|  |  | Potassium formate | Parts by weight | 0 | 0 | 0 | 0 | 0 |
|  |  | Potassium propionate | Parts by weight | 0 | 0 | 0 | 0 | 0 |
|  |  | Magnesium acetate tetrahydrate | Parts by weight | 0 | 0 | 0 | 0 | 0 |
|  | Light emitting material having terephthelic acid ester structure | Diethyl-2,5-dihydroxy terephthalate | Parts by weight | 0 | 0 | 0.5 | 0.5 | 0.5 |
|  |  | Dimethyl-2,5-dihydroxy terephthalate | Parts by weight | 0 | 0 | 0 | 0 | 0 |
|  |  | Potassium concentration | ppm | 0 | 0 | 0 | 0 | 80 |
|  |  | Magnesium concentration | ppm | 0 | 0 | 0 | 0 | 0 |
|  |  | Thickness of Intermediate layer | μm | 100 | 100 | 100 | 100 | 100 |
| Surface layer |  | Polyvinyl butyral | Parts by weight | 100 | 100 | 100 | 100 | 100 |
|  |  |  | Degree of polymerization | 1700 | 1700 | 1700 | 1700 | 1700 |
|  |  |  | Hydroxyl group content (mol %) | 30.6 | 30.6 | 30.6 | 30.6 | 30.6 |
|  |  |  | Degree of butyralization (mol %) | 68.5 | 68.5 | 68.5 | 68.5 | 68.5 |
|  |  |  | Acetyl group content (mol %) | 0.9 | 0.9 | 0.9 | 0.9 | 0.9 |
|  |  | Plasticizer (3GO) | Parts by weight | 40 | 40 | 40 | 40 | 40 |
|  | Adhesion control agent | Potassium acetate | Parts by weight | 0.084 | 0.056 | 0.056 | 0.056 | 0.056 |
|  |  | Potassium 2-ethylhexanoate | Parts by weight | 0 | 0 | 0 | 0 | 0 |
|  |  | Potassium formate | Parts by weight | 0 | 0 | 0 | 0 | 0 |
|  |  | Potassium propionate | Parts by weight | 0 | 0 | 0 | 0 | 0 |
|  |  | Magnesium acetate tetrahydrate | Parts by weight | 0 | 0 | 0 | 0.049 | 0 |
|  | Light emitting material having terephthalic acid ester structure | Diethyl-2,5-dihydroxy terephthalate | Parts by weight | 0.8 | 0 | 0.5 | 0.5 | 0.5 |
|  |  | Dimethyl-2,5-dihydroxy terephthalate | Parts by weight | 0 | 0.6 | 0 | 0 | 0 |
|  |  | Potassium concentration | ppm | 240 | 160 | 160 | 160 | 160 |
|  |  | Magnesium concentration | ppm | 0 | 0 | 0 | 40 | 0 |
|  |  | Thickness of surface layer | μm | 350 | 350 | 350 | 350 | 350 |
| Evaluation |  | Evaluation of light emission | Luminance (cd/m$^2$) | 970 | 920 | 920 | 923 | 921 |
|  |  | Evaluation of color change | Initial YI | 8 | 7 | 7 | 10 | 7 |
|  |  | Evaluation of adhesion | Pummel value | 3 | 4 | 4 | 4 | 4 |

TABLE 5

|  |  |  |  | Example 30 | Example 31 | Example 32 | Example 33 | Example 34 |
|---|---|---|---|---|---|---|---|---|
| Intermediate layer |  | Polyvinyl butyral | Parts by weight | 100 | 100 | 100 | 100 | 100 |
|  |  |  | Degree of polymerization | 2300 | 2300 | 2300 | 2300 | 2300 |
|  |  |  | Hydroxyl group content (mol %) | 22 | 16 | 24 | 22 | 22 |
|  |  |  | Degree of butyralization (mol %) | 65 | 71 | 60 | 65 | 65 |
|  |  |  | Acetyl group content (mol %) | 13 | 13 | 16 | 13 | 13 |
|  |  | Plasticizer (3GO) | Parts by weight | 60 | 60 | 60 | 60 | 60 |
|  |  | Potassium acetate | Parts by weight | 0 | 0 | 0 | 0 | 0 |
|  |  | Potassium 2-ethylhexanoate | Parts by weight | 0 | 0 | 0 | 0 | 0 |
|  |  | Potassium formate | Parts by weight | 0 | 0 | 0 | 0 | 0 |
|  |  | Potassium propionate | Parts by weight | 0 | 0 | 0 | 0 | 0 |
|  |  | Magnesium acetate tetrahydrate | Parts by weight | 0.049 | 0 | 0 | 0 | 0 |
|  | Light emitting material having terephthalic acid ester structure | Diethyl-2,5-dihydroxy terephthalate | Parts by weight | 0.5 | 0 | 0 | 0 | 0 |
|  |  | Dimethyl-2,5-dihydroxy terephthalate | Parts by weight | 0 | 0 | 0 | 0 | 0 |
|  |  | Potassium concentration | ppm | 0 | 0 | 0 | 0 | 0 |
|  |  | Magnesium concentration | ppm | 40 | 0 | 0 | 0 | 0 |
|  |  | Thickness of Intermediate layer | μm | 100 | 100 | 100 | 100 | 100 |
| Surface layer |  | Polyvinyl butyral | Parts by weight | 100 | 100 | 100 | 100 | 100 |
|  |  |  | Degree of polymerization | 1700 | 1700 | 1700 | 1700 | 1700 |
|  |  |  | Hydroxyl group content (mol %) | 30.6 | 30.6 | 30.6 | 30.7 | 30.1 |
|  |  |  | Degree of butyralization (mol %) | 68.5 | 68.5 | 68.5 | 68.5 | 68.3 |
|  |  |  | Acetyl group content (mol %) | 0.9 | 0.9 | 0.9 | 0.8 | 1.6 |

TABLE 5-continued

|  |  |  | | | | | | |
|---|---|---|---|---|---|---|---|---|
| | | Plasticizer (3GO) | Parts by weight | 40 | 40 | 40 | 40 | 40 |
| | Adhesion control agent | Potassium acetate | Parts by weight | 0.056 | 0.056 | 0.056 | 0.056 | 0.056 |
| | | Potassium 2-ethylhexanoate | Parts by weight | 0 | 0 | 0 | 0 | 0 |
| | | Potassium formate | Parts by weight | 0 | 0 | 0 | 0 | 0 |
| | | Potassium propionate | Parts by weight | 0 | 0 | 0 | 0 | 0 |
| | | Magnesium acetate tetrahydrate | Parts by weight | 0 | 0 | 0.049 | 0 | 0.049 |
| | Light emitting material having terephthalic acid ester structure | Diethyl-2,5-dihydroxy terephthalate | Parts by weight | 0.5 | 0.6 | 0.6 | 0.6 | 0.6 |
| | | Dimethyl-2,5-dihydroxy terephthalate | Parts by weight | 0 | 0 | 0 | 0 | 0 |
| | | Potassium concentration | ppm | 160 | 160 | 160 | 160 | 160 |
| | | Magnesium concentration | ppm | 0 | 0 | 40 | 0 | 40 |
| | | Thickness of surface layer | μm | 350 | 350 | 350 | 350 | 350 |
| Evaluation | | Evaluation of light emission | Luminance (cd/m$^2$) | 918 | 927 | 921 | 920 | 918 |
| | | Evaluation of color change | Initial YI | 10 | 7 | 10 | 7 | 10 |
| | | Evaluation of adhesion | Pummel value | 4 | 4 | 4 | 4 | 4 |

TABLE 6

| | | | | Example 35 | Example 36 | Example 37 | Example 38 | Example 39 |
|---|---|---|---|---|---|---|---|---|
| Intermediate layer | | Polyvinyl butyral | Parts by weight | 100 | 100 | 100 | 100 | 100 |
| | | | Degree of polymerization | 2300 | 2300 | 2300 | 1700 | 3000 |
| | | | Hydroxyl group content (mol %) | 22 | 22 | 22 | 30.6 | 22 |
| | | | Degree of butyralization (mol %) | 65 | 65 | 65 | 68.5 | 65 |
| | | | Acetyl group content (mol %) | 13 | 13 | 13 | 0.9 | 13 |
| | | Plasticizer (3GO) | Parts by weight | 70 | 50 | 45 | 40 | 60 |
| | | Potassium acetate | Parts by weight | 0 | 0 | 0 | 0 | 0 |
| | | Potassium 2-ethylhexanoate | Parts by weight | 0 | 0 | 0 | 0 | 0 |
| | | Potassium formate | Parts by weight | 0 | 0 | 0 | 0 | 0 |
| | | Potassium propionate | Parts by weight | 0 | 0 | 0 | 0 | 0 |
| | | Magnesium acetate tetrahydrate | Parts by weight | 0 | 0 | 0 | 0 | 0 |
| | Light emitting material having terephthalic acid ester structure | Diethyl-2,5-dihydroxy terephthalate | Parts by weight | 0 | 0 | 0 | 0 | 0 |
| | | Dimethyl-2,5-dihydroxy terephthalate | Parts by weight | 0 | 0 | 0 | 0 | 0 |
| | | Potassium concentration | ppm | 0 | 0 | 0 | 0 | 0 |
| | | Magnesium concentration | ppm | 0 | 0 | 0 | 0 | 0 |
| | | Thickness of intermediate layer | μm | 100 | 100 | 100 | 100 | 100 |
| Surface layer | | Polyvinyl butyral | Parts by weight | 100 | 100 | 100 | 100 | 100 |
| | | | Degree of polymerization | 1700 | 1700 | 1700 | 1700 | 1700 |
| | | | Hydroxyl group content (mol %) | 30.6 | 30.6 | 30.6 | 30.6 | 30.6 |
| | | | Degree of butyralization (mol %) | 68.5 | 68.5 | 68.5 | 68.5 | 68.5 |
| | | | Acetyl group content (mol %) | 0.9 | 0.9 | 0.9 | 0.9 | 0.9 |
| | | Plasticizer (3GO) | Parts by weight | 40 | 40 | 40 | 40 | 40 |
| | Adhesion control agent | Potassium acetate | Parts by weight | 0.056 | 0.056 | 0.056 | 0.056 | 0 |
| | | Potassium 2-ethylhexanoate | Parts by weight | 0 | 0 | 0 | 0 | 0 |
| | | Potassium formate | Parts by weight | 0 | 0 | 0 | 0 | 0.047 |
| | | Potassium propionate | Parts by weight | 0 | 0 | 0 | 0 | 0 |
| | | Magnesium acetate tetrahydrate | Parts by weight | 0 | 0 | 0 | 0 | 0 |
| | Light emitting material having terephthalic acid ester structure | Diethyl-2,5-dihydroxy terephthalate | Parts by weight | 0.6 | 0.6 | 0.6 | 0.6 | 0.6 |
| | | Dimethyl-2,5-dihydroxy terephthalate | Parts by weight | 0 | 0 | 0 | 0 | 0 |
| | | Potassium concentration | ppm | 160 | 160 | 160 | 160 | 160 |
| | | Magnesium concentration | ppm | 0 | 0 | 0 | 0 | 0 |
| | | Thickness of surface layer | μm | 350 | 350 | 350 | 350 | 350 |
| Evaluation | | Evaluation of light emission | Luminance (cd/m$^2$) | 928 | 926 | 929 | 922 | 928 |
| | | Evaluation of color change | Initial YI | 7 | 7 | 7 | 7 | 7 |
| | | Evaluation of adhesion | Pummel value | 4 | 4 | 4 | 4 | 4 |

TABLE 7

| | | | Example 40 | Example 41 | Example 42 | Comparative Example 2 | Comparative Example 3 |
|---|---|---|---|---|---|---|---|
| Intermediate layer | Polyvinyl butyral | Parts by weight | 100 | 100 | 100 | 100 | 100 |
| | | Degree of polymerization | 3000 | 3000 | 3000 | 2300 | 2300 |
| | | Hydroxyl group content (mol %) | 22 | 22 | 22 | 22 | 22 |
| | | Degree of butyralization (mol %) | 65 | 65 | 65 | 65 | 65 |
| | | Acetyl group content (mol %) | 13 | 13 | 13 | 13 | 13 |
| | Plasticizer (3GO) | Parts by weight | 60 | 60 | 60 | 60 | 60 |
| | Potassium acetate | Parts by weight | 0 | 0 | 0 | 0 | 0 |
| | Potassium 2-ethylhexanoate | Parts by weight | 0 | 0 | 0 | 0 | 0 |
| | Potassium formate | Parts by weight | 0 | 0 | 0 | 0 | 0 |
| | Potassium propionate | Parts by weight | 0 | 0 | 0 | 0 | 0 |
| | Magnesium acetate tetrahydrate | Parts by weight | 0 | 0 | 0 | 0 | 0.11 |
| | Light emitting material having terephthalic acid ester structure | Diethyl-2,5-dihydroxy terephthalate Parts by weight | 0 | 0 | 0 | 0 | 0.5 |
| | | Dimethyl-2,5-dihydroxy terephthalate Parts by weight | 0 | 0 | 0 | 0 | 0 |
| | Potassium concentration | ppm | 0 | 0 | 0 | 0 | 0 |
| | Magnesium concentration | ppm | 0 | 0 | 0 | 0 | 90 |
| | Thickness of Intermediate layer | μm | 100 | 100 | 100 | 100 | 100 |
| Surface layer | Polyvinyl butyral | Parts by weight | 100 | 100 | 100 | 100 | 100 |
| | | Degree of polymerization | 1700 | 1700 | 1700 | 1700 | 1700 |
| | | Hydroxyl group content (mol %) | 30.6 | 30.6 | 30.6 | 30.6 | 30.6 |
| | | Degree of butyralization (mol %) | 68.5 | 68.5 | 68.5 | 68.5 | 68.5 |
| | | Acetyl group content (mol %) | 0.9 | 0.9 | 0.9 | 0.9 | 0.9 |
| | Plasticizer (3GO) | Parts by weight | 40 | 40 | 40 | 40 | 40 |
| | Adhesion control agent | Potassium acetate Parts by weight | 0 | 0.056 | 0.056 | 0 | 0 |
| | | Potassium 2-ethylhexanoate Parts by weight | 0 | 0 | 0 | 0 | 0 |
| | | Potassium formate Parts by weight | 0 | 0 | 0 | 0 | 0 |
| | | Potassium propionate Parts by weight | 0.063 | 0 | 0 | 0 | 0 |
| | | Magnesium acetate tetrahydrate Parts by weight | 0 | 0 | 0 | 0.11 | 0.11 |
| | Light emitting material having terephthalic acid ester structure | Diethyl-2,5-dihydroxy terephthalate Parts by weight | 0.6 | 0 | 0.6 | 0.6 | 0.5 |
| | | Dimethyl-2,5-dihydroxy terephthalate Parts by weight | 0 | 0.6 | 0 | 0 | 0 |
| | Potassium concentration | ppm | 160 | 160 | 160 | 0 | 0 |
| | Magnesium concentration | ppm | 0 | 0 | 0 | 90 | 90 |
| | Thickness of surface layer | μm | 350 | 350 | 350 | 350 | 350 |
| Evaluation | Evaluation of light emission | Luminance (cd/m$^2$) | 929 | 921 | 920 | 910 | 912 |
| | Evaluation of color change | Initial YI | 7 | 7 | 7 | 30 | 35 |
| | Evaluation of adhesion | Pummel value | 4 | 4 | 4 | 4 | 4 |

TABLE 8

| Exposure degree of interlayer film (area %) | Pummel value |
|---|---|
| 90 < Exposure degree ≤ 100 | 0 |
| 85 < Exposure degree ≤ 90 | 1 |
| 60 < Exposure degree ≤ 85 | 2 |
| 40 < Exposure degree ≤ 60 | 3 |
| 20 < Exposure degree ≤ 40 | 4 |
| 10 < Exposure degree ≤ 20 | 5 |
| 5 < Exposure degree ≤ 10 | 6 |
| 2 < Exposure degree ≤ 5 | 7 |
| Exposure degree ≤ 2 | 8 |

INDUSTRIAL APPLICABILITY

The present invention provides an interlayer film for laminated glass which produces a high contrast image under light radiation, is less susceptible to color changes, and allows for control of the adhesion. The present invention further provides a laminated glass including the interlayer film for laminated glass.

The invention claimed is:

1. An interlayer film for laminated glass comprising a light emitting layer containing a polyvinyl acetal, a plasticizer, a light emitting material having a terephthalic acid ester structure, a potassium salt, and optionally a magnesium element, wherein:

the polyvinyl acetal has 40 to 85 mol % of a degree of acetalization, 15 to 35 mol % of hydroxyl group content and 0.2 to 30 mol % of acetyl group content, the light emitting material having a terephthalic acid ester structure is diethyl-2,5-dihydroxy terephthalate, dimethyl-2,5-dihydroxy terephthalate or diethyl-2,5-diamino terephthalate, the potassium salt is potassium formate, potassium acetate, potassium acetate in combination with potassium 2-ethylhexanoate, or potassium propionate, the potassium element content of the light emitting layer is 50 ppm to 300 ppm, the magnesium element content of the light emitting layer is 40 ppm or less, the light emitting layer comprises 0.001 to 5 parts by weight of light emitting material having a terephthalic acid ester structure for 100 parts by weight of polyvinyl acetal, the light emitting layer comprises 20 to 80 parts by weight of the plasticizer for 100 parts by weight of polyvinyl acetal, the thickness of the light emitting layer is 300 to 2000 μm, and when the interlayer film is inserted between two clear glass plates having a thickness of 2.5 mm, the resulting laminated glass has a yellow index (YI) value which is determined with a spectrophotometer in accordance with JIS Z 8722 of 15 or less.

2. The interlayer film for laminated glass according to claim 1, wherein the thickness of the light emitting layer is 300 to 800 μm.

\* \* \* \* \*